United States Patent [19]

Williams

[11] Patent Number: 4,501,851

[45] Date of Patent: Feb. 26, 1985

[54] UREA-FORMALDEHYDE PRECURSOR

[75] Inventor: James H. Williams, Louisville, Ky.

[73] Assignee: Borden, Inc., Columbus, Ohio

[21] Appl. No.: 584,441

[22] Filed: Feb. 28, 1984

Related U.S. Application Data

[63] Continuation-in-part of Ser. No. 416,573, Sep. 10, 1982, Pat. No. 4,410,685.

[51] Int. Cl.$^3$ ........................ C08L 51/00; C08G 12/12
[52] U.S. Cl. ..................................... 524/542; 528/259
[58] Field of Search .......................... 524/542; 528/259

[56] References Cited

U.S. PATENT DOCUMENTS

| | | | |
|---|---|---|---|
| 2,755,263 | 7/1956 | Scheuermann | 524/512 |
| 2,923,644 | 2/1960 | Herbes | 524/542 X |
| 3,102,108 | 8/1963 | Aebi et al. | 424/82 |
| 3,920,390 | 11/1975 | Petersen et al. | 8/185 |
| 3,931,063 | 1/1976 | Renner | 521/63 |
| 4,021,413 | 5/1977 | Eisele et al. | 528/259 |
| 4,273,883 | 6/1981 | Korf | 528/261 X |
| 4,298,512 | 11/1981 | Sartoretto et al. | 528/259 X |
| 4,381,368 | 4/1983 | Spurlock | 528/259 X |
| 4,409,015 | 10/1983 | Grace, Jr. | 71/28 |
| 4,409,293 | 10/1983 | Williams | 428/524 |
| 4,429,075 | 1/1984 | Carlson | 524/542 X |

FOREIGN PATENT DOCUMENTS 532326 10/1956 Canada.
1168882 4/1964 Fed. Rep. of Germany.

*Primary Examiner*—Lucille M. Phynes
*Attorney, Agent, or Firm*—Robbins & Laramie

[57] ABSTRACT

Urea-formaldehyde precursors are produced in a two-stage process. In the first stage, urea is slowly added to an acidic solution of formaldehyde at a pH of 1.0 or less, at a rate that maintains the temperature at 50° C. but not in excess of 98° C. When an F/U mole ratio of 3.25:1 to 2.5:1 has been attained, the pH is adjusted to the basic side, generally from about 7.2 to about 8.0. In the second stage, additional urea is added to the condensate produced in the first stage, to attain an F/U mole ratio of 3.0:1 to 2.5:1. The condensate and precursor have fertilizer applications. The precursor is useful in urea-formaldehyde resin production.

29 Claims, No Drawings

UREA-FORMALDEHYDE PRECURSOR

RELATED APPLICATION

This application is a continuation-in-part of my earlier patent application, Ser. No. 416,573, filed Sept. 10, 1982, now U.S. Pat. No. 4,410,685, which is expressly incorporated herein by reference. My earlier application disclosed a process for the production of a low emission urea-formaldehyde resin useful as an adhesive. The adhesive was particularly useful as a binder for wood particles and chips.

The process disclosed in my earlier application was one for preparing a urea-formaldehyde base resin having an F/U mole ratio of 1.0:1 to 1.2:1, that is hydrolytically stable. This process comprises adjusting an aqueous formaldehyde solution to a pH of from about 0.5 to about 2.5, slowly charging urea to this formaldehyde solution while maintaining the temperature of the solution in the range from about 50° to about 70° C., neutralizing the reaction mixture after attaining a 2.9:1 to 3.1:1 mole ratio of formaldehyde to urea and a Gardner viscosity in the range of T+-V+, and then adding a final charge of urea to achieve the desired final F/U mole ratio.

BACKGROUND OF THE INVENTION

This invention relates to a stable urea-formaldehyde precursor, and to a process for making it. More particularly, the invention is concerned with a precursor that is a versatile material that can be used in several different ways, i.e., in formulating fertilizers, in the manufacture of urea-formaldehyde resins, and as a slow release coating for granulated fertilizers such as prilled urea.

Prilled urea is often used as a raw material in the manufacture of urea-formaldehyde resins. During the manufacture of prilled urea, some product is crushed during transportation and handling. Also, during storage, some urea cakes and forms hard chunks because of pressure and exposure to moisture. The chunks and crushed material are referred to as "overs and unders", since they deviate from the standard size range for urea prills. The overs and unders usually sell at a discount. They generally require additional handling prior to use in resin manufacturing. The present invention can utilize the urea overs and unders, thus offering an opportunity for economy.

SUMMARY OF THE INVENTION

The invention provides a new method for manufacturing a stable urea-formaldehyde precursor. The urea-formaldehyde precursor of this invention is characterized by a formaldehyde to urea (F/U) molar ratio of 3.25:1 to 2.5:1, with a preferred F/U molar ratio of 3.0:1 to 2.5:1, and a more preferred F/U molar ratio of 2.6:1 to 2.5:1. The precursor product is, in a preferred embodiment, a stable urea-formaldehyde condensation product containing the reaction product of 28.5% urea and 35.5% formaldehyde, by weight as added, in an aqueous vehicle. The reaction takes place in at least two stages.

The preferred product of this invention is derived from urea, optionally in the form of overs and unders, and a 50% solution of formaldehyde, although paraformaldehyde and aqueous formaldehyde of other concentrations can be used. This product is produced by a process that is also a part of the invention. This process requires no application of heat, no base catalyzed methylolation, and can be carried out in about one-fifth of the time required for the manufacture of other prior art precursors or concentrates.

In this process, two stages preferably are used. A condensate is formed in the first stage. The precursor is formed in the second stage, in which the condensate produced in the first stage is the starting material. While both stages may be carried out at 50° C. to 98° C., preferably temperatures above 95° C. are avoided, and more preferably, temperatures above 85° C. are avoided, to minimize side reactions.

To form the condensate, urea is added to a very acidic solution of formaldehyde at a rate such that the temperature of the reaction mixture and the F/U mole ratio are maintained within desired ranges. Thus, the formaldehyde solution is adjusted to a pH of 0.5 to 1.0, and urea is then slowly added, until a preselected mole ratio of formaldehyde to urea is reached. The exothermic reaction that occurs is used to keep the temperature of the reaction mixture at 50° C. to 98° C., but preferably not above 95° C., and more preferably, not above 85° C. When the desired amount of urea has been added so that the F/U mole ratio is in the range of 5.0:1 to 3.0:1, but preferably 3.25:1 to 3.0:1, the pH is adjusted to the basic side. Thus, when the targeted F/U mole ratio of has been attained of 5.0:1 to 3.0:1, with a preferred F/U ratio of 3.25:1 to 3.0:1, and a most preferred ratio of 3.1:1, the pH of the solution is adjusted to 7.2 to 8.0, or preferably, from 7.2 to 7.9. To form the precursor, additional urea is added to the condensate, to a mole ratio of 3.25:1 to 2.5:1, preferably 3.0:1 to 2.5:1, and more preferably, 2.6:1 to 2.5:1, the most preferred mole ratio being 2.5:1. The final precursor preferably has an F/U mole ratio of 2.6:1 to 2.5:1, or most preferably, 2.5:1. Thus, in the most preferred embodiment, the precursor contains 28.5% urea and 35.5% formaldehyde by weight, as added.

The process of making the precursor product is summarized broadly as: slowly charging urea to an acidic aqueous formaldehyde solution having a pH of 0.8 to 1.0, while maintaining the temperature of the solution in the range from about 50° C. to about 98° C., to form a condensate having an initial F/U mole ratio from 5:1 to 3.0:1, then adjusting the pH of the condensed reaction mixture to 7.2 to 8.0, then adding more urea to attain an F/U mole ratio in the range from 3.25:1 to 2.5:1, and then adjusting the pH of the condensate product to 7.2 to 8.0.

The condensate product is characterized generally as having an F/U mole ratio of from 5:1 to 2.5:1, produced by the initially acidic reaction between urea and formaldehyde at an initial pH less than about 1.0, having an adjusted pH of 7.2 to 8.0, having a solids content of 60% to 69%, and having a storage life at 72° F. greater than 102 days without becoming cloudy or settling. To make the precursor product, urea is added to the condensate at 50° C. to 98° C., but preferably at a temperature lower than 85° C., until the desired precursor product has been produced. The pH is then adjusted, if necessary, to 7.2 to 8.0. The precursor product is characterized generally as having a final F/U mole ratio in the range from 3.25:1 to 2.5:1, a solids content of from 62% through 69%, an adjusted pH of 7.2 to 8.0, and a storage life at 72° F. that is greater than 102 days, without becoming cloudy or settling.

The precursor product of the invention is particularly useful as a prepolymer for the manufacture of more advanced urea-formaldehyde resins. It has the advantage of being storage stable over quite long periods of time. The most preferred final F/U mole ratio range of the product of 2.5:1 represents the maximum amount of urea that can be shipped in what is, in effect, a formaldehyde solution, while remaining reasonably stable.

The condensation products and resin precursors can be used as sources of nitrogen for plants and are particularly useful when blended with inorganic sources of the primary plant nutrients. Such blends can be used to manufacture either liquid or dry ureaform type fertilizers. Both of these products have potential uses with thermoplastic resinoid hot melt compositions for furniture compounds. They can also be used as slow release coating materials for prilled urea and other granular fertilizer materials.

Both the condensate and the resin precursor are produced in the form of aqueous dispersions.

DETAILED DESCRIPTION OF THE INVENTION

A U-F precursor production process has now been discovered that requires no application of heat when used with a 50% formaldehyde solution, and that requires less than 20% of the time required to manufacture precursor or concentrate products of the prior art.

This invention selectively synthesizes a urea-formaldehyde precursor product by controlling pH and temperature of the aqueous formaldehyde system, and the initial F/U mole ratio, thereby controlling the nature of the initial condensation reaction. This selective synthesis through this new process forms a variety of methylene-urea polymers having varying chain lengths, and these in turn lead to the production of a stable urea-formaldehyde precursor.

The first stage of the process is conducted in a strongly acidic environment. This procedure eliminates the need for the application of heat during the first, condensation stage. The exotherm is sufficient to drive the reaction to the desired level of condensation, and can be controlled by a programmed addition of urea to the acidified formaldehyde solution. This stage of the process can reduce the overall cycle time for manufacturing urea-formaldehyde precursor by approximately 80%, as compared to prior art precursor production processes.

In this first stage of the process, a formaldehyde solution is adjusted to a highly acid pH by the addition of an appropriate acid. In accordance with one preferred embodiment of the invention, the formaldehyde solution preferably contains about 49.8% to about 50.2% formaldehyde, by weight. Although other formaldehyde solutions, e.g., 37%, could be utilized, it is preferred to use the 49.8% to 50.2% solutions because they yield a convenient, high solids content product. If other, different formaldehyde solutions are utilized, the amount of water present will differ. Accordingly, the formaldehyde solution used should be assayed by conventional techniques in order to produce products that have the desired specifications discussed below.

The pH of the aqueous formaldehyde reactant is adjusted to 0.5 to 1.0, preferably 0.9, using any suitable organic or inorganic acid which will produce a pH in this range. Suitable acids include, but are not limited to, formic acid, hydrochloric acid, sulfuric acid, and p-toluene sulfonic acid, or a combination of two or more of these. Of these acids, sulfuric acid is preferred.

The urea is then slowly continuously or incrementally charged to the acidic formaldehyde solution to maintain a temperature above about 50° C. and below about 98° C., preferably always below 95° C., and more preferably not above 85° C. in the exothermic reaction mixture. As a result, no additional heat is required. The urea is charged until the desired F/U mole ratio of 5:1 to 3.0:1, and preferably 3.25:1 to 3.0:1, and most preferably 3.1:1, is reached. The pH is then adjusted to 7.2 to 7.9, preferably 7.7 to 7.9, preferably with 50% NaOH.

When the urea is added in increments during the first stage, acidic condensation reaction, it is preferred to add the urea in about fifteen equal increments, timed so that the temperature of the reaction mixture is maintained below about 98° C. After the urea has been added, by whatever method, the mixture is stirred for 5 minutes, before the pH is adjusted to 7.7 to 7.9.

For the second stage, more urea is added to the condensate product of the second stage to a desired final F/U mole ratio for the precursor, which may be 3.25:1 to 2.5:1, or more preferably 3.0:1 to 2.5:1, or most preferably 2.5:1. The amount of urea which is added to the formaldehyde solution during the entire reaction is sufficient to provide the desired urea content of the final urea-formaldehyde precursor product. At this point, the reaction is complete and the urea-formaldehyde precursor, after pH adjustment, is ready for storage or transportation for use in the manufacture of other products.

To recapitulate, to produce the initial acid condensation product, the process comprises slowly charging urea to an acidic aqueous formaldehyde solution having a pH of from about 0.5 to about 1.0 while maintaining the temperature of the solution in the range from about 50° C. to about 98° C., until the initial F/U mole ratio is not above 5:1 and not below 2.5:1, and then neutralizing the reaction mixture to a pH of 7.2 to 8.0. Generally, the solids content of the condensate obtained will be from 45% or so, up to about 69%. For realization of the potential economies, however, the solids content of the condensate (based on the weight of added formaldehyde and urea) should be from 60% to 64%, and most preferably, 61% to 62%.

The urea-formaldehyde precursor product is prepared from the acidic condensate after the pH adjustment, by adding more urea. Overall, the reaction mixture for the precursor is, in one preferred embodiment, made up from 71.03 weight percent of the formaldehyde solution, which corresponds to 35.41 to 35.61 weight percent formaldehyde, and 28.45 weight percent urea, the remainder being water and the acid and base materials which have been added for pH adjustment.

In this application the composition of the product is described, as is customary in the art, in terms of the weights of formaldehyde and urea added to react. Thus, for example, 35.5% by weight formaldehyde (i.e., essentially free of water) may be reacted with 28.45% urea by weight, based on the weight of the reaction mixture. The reaction mixture may be said to be 63.95% solids (rounded to 64%) as is conventional in the art, but those skilled in the art will understand that the reaction of urea and formaldehyde produces water, so that the actual solids content is only 53% to 54% by weight of the aqueous reaction mixture. References herein to the solids content of the reaction product, unless otherwise expressly designated, refer to the sum of the weights of urea and of formaldehyde that are added, to react together.

The final precursor product should have, in a preferred embodiment, a solids content in the range from 45% to 69% by weight, based on the weights of urea and formaldehyde added to react, a specific gravity (Westphal) of 1.236 to 1.242, preferably 1.239, a pH of 7.7 to 7.9, and a Brookfield viscosity as produced, and measured at 25° C., using an RVF viscometer with a No. 1 spindle at 20 rpm, of 24 cps. to about 100 cps, preferably 35-100 cps. The total percentage content of urea plus formaldehyde is most preferably 64% by weight.

One preferred process for preparing a urea-formaldehyde resin precursor according to the invention, having a preferred F/U mole ratio of 3.25:1 to 2.5:1, comprises slowly charging urea to an acidic aqueous formaldehyde solution having a pH of 0.5 to 1.0, while maintaining the temperature of the solution in the range from about 50° C. to about 98° C., to form a condensate having an initial F/U mole ratio from 5:1 to 3.0:1, then adjusting the pH of the condensed reaction mixture of 7.2 to 8.0, adding more urea to attain an F/U mole ratio in the range from 3.25:1 to 2.5:1, preferably 3.0:1 to 2.5:1, and then adjusting the pH of the final reaction product to 7.2 to 8.0.

The resin precursor product that is obtained from this process can be characterized as having an F/U mole ratio in the range from 3.25:1 to 2.5:1, preferably 3.0:1 to 2.5:1, a solids content of from 60% through 69%, preferably 61% to 66%, a pH of 7.2 to 8.0, and a storage life at 72° F. that is greater than 102 days, without becoming cloudy or settling. Preferably, the mole ratio is 3.0:1 or less, most preferably 2.6:1 or less, the solids content is at least 63%, and the pH is 7.4 or higher, preferably 7.7 to 7.9.

The invention is now exemplified in greater detail by several demonstrations. In the following examples and elsewhere throughout the specification, parts and percentages are by weight, and the temperatures are in degrees Celsius, unless expressly indicated otherwise. Mole ratios refer to the mole ratio of formaldehyde to urea (F/U ratio) unless indicated otherwise. All viscosity determinations were made on a Brookfield RVF viscometer using a No. 1 spindle at 20 rpm at 25° C., unless otherwise stated.

In practicing the invention, it may be observed that seemingly identical processes will nevertheless produce apparently different products. This may be manifested in product viscosity differences, as in Examples 4 and 7 below. These differences can be attributed, it is believed, primarily to three factors. These are batch size, speed and type of stirring, and variations between viscometers. Generally the product viscosity is from 24 to 100 cps, more often 30 to 100 cps.

EXAMPLE 1

One Stage (Acid) Condensation F/U Mole Ratio 3.25:1

An aqueous formaldehyde solution was assayed and found to contain 50% formaldehyde. 3,052 grams of this solution were charged to a reactor and agitation was initiated. The pH of the formaldehyde solution was adjusted to less than 1 using approximately 3.6 grams of concentrated sulfuric acid. The temperature of the acidified solution was then raised to 50° C.

Then 937.6 grams of prilled urea were charged to the formaldehyde solution in fifteen equal increments over a fifteen minute time period, so that the temperature remained between 50° C. and 95° C.

After all of the urea had been added, the mixture was held at 95° C. for five minutes, and the pH was then adjusted to 7.7 to 7.9 with 50% sodium hydroxide. The reaction was cooled to 25° C. and then discharged to a container.

The final mole ratio of this urea-formaldehyde precursor was 3.25:1, the viscosity was 35 cps, pH 7.5, and calculated solids were 62%.

EXAMPLE 2

One Stage (Acid) Condensation F/U Mole Ratio 3.14:1

A reactor was charged with 3,031 grams of a 50% formaldehyde solution. The pH of the formaldehyde solution was adjusted to 0.89 with approximately 2 grams of concentrated sulfuric acid. The temperature of the solution was raised to 50° C., and 963 grams of prilled urea were charged to the formaldehyde solution in fifteen equal increments over a fifteen minute time period, maintaining the temperature between 50° C. and 95° C.

After the urea was added, the mixture was held for five minutes, then the pH was adjusted to 7.7 to 7.9 with 50% sodium hydroxide. After cooling to 25° C. the urea-formaldehyde precursor was placed in an appropriate container.

This urea-formaldehyde precursor had an F/U mole ratio of 3.14:1, a viscosity of 42 cps, pH of 7.4, and a calculated solids content of 62%.

EXAMPLE 3

Two Stage Precursor Production; F/U Mole Ratio 2.75:1

An aqueous formaldehyde solution was assayed and found to contain 50% formaldehyde. 2,916 grams of this solution were charged to a reactor and agitation was initiated. The pH of the formaldehyde solution was adjusted to 0.9 with approximately 3.2 grams of concentrated sulfuric acid. The temperature of the solution was raised to 50° C., and 898 grams of prilled urea were charged to the formaldehyde solution in fifteen equal increments over a fifteen minute time period, maintaining the temperature between 50° and 95° C.

After the urea was added, the mixture was held for approximately five minutes and the pH was adjusted to 7.7 to 7.9 with 50% sodium hydroxide. A second charge of 163.6 grams of urea was added. The pH was adjusted to 7.7 to 7.9. The reaction mixture was then cooled to 25° C. and transferred to an appropriate container.

This urea-formaldehyde precursor had an F/U mole ratio of 2.75:1, a viscosity of 80 cps, pH of 7.5 and a calculated solids content of 63%.

EXAMPLE 4

Two Stage Precursor Production; F/U Mole Ratio 2.50:1

A reactor was charged with 2,841 grams of an aqueous formaldehyde solution which assayed at 50%. The pH of the formaldehyde solution was adjusted to 0.95 with approximately 2.8 grams of concentrated sulfuric acid. The temperature of the solution was raised to 50° C. and 875.2 grams of prilled urea were charged to the formaldehyde solution in fifteen equal increments over a fifteen minute time period, maintaining the temperature between 50° and 95° C.

After the urea was added the mixture was held at the final temperature for five minutes and the pH was adjusted to 7.7 to 7.9 with 50% sodium hydroxide. A second amount of 262.8 grams of urea was then added. The pH was again adjusted to 7.7 to 7.9. The reaction mixture was allowed to cool to 25° C., and was then placed in an appropriate container.

This product was found to have an F/U mole ratio of 2.5:1, viscosity of 89 cps, pH of 7.5, and a calculated solids content of 64%.

EXAMPLE 5

Two Stage Reaction; F/U Mole Ratio 2.25:1

A 2.25 F/U mole ratio urea-formaldehyde precursor was prepared by first adding to a reactor 2,755 grams of an aqueous formaldehyde solution that assayed at 49.9%. The pH of the formaldehyde solution was adjusted to 0.9 with approximately 2.8 grams of concentrated sulfuric acid. The temperature of the solution was raised to 50° C., and 848.4 grams of prilled urea were charged to the solution in fifteen equal increments over a fifteen minute time period, maintaining the temperature between 50° C. and 95° C.

After the urea was added the mixture was held at its final temperature for approximately five minutes, and the pH was then adjusted to 7.7 to 7.9 with 50% sodium hydroxide. A second urea charge, amounting to 376.4 grams, was added to the solution and the pH was again adjusted to 7.7 to 7.9. The reaction mixture was allowed to cool to 25° C., and the final product was then placed in an appropriate container.

The 2.25 F/U mole ratio product had a viscosity of 93 cps, pH of 7.4, and a calculated solids content of 65%.

EXAMPLE 6

Two Stage Reaction; F/U Mole Ratio 2.0:1

An aqueous formaldehyde solution was assayed and found to contain 50% formaldehyde. The pH of the formaldehyde solution was adjusted to 0.9 with approximately 2.8 grams of concentrated sulfuric acid, the the formaldehyde solution was then agitated. The temperature of the solution was raised to 50° C. and 818 grams of prilled urea were added in fifteen equal increments over a fifteen minute period, maintaining the temperature between 50° C. and 95° C.

After the urea was added, the mixture was held at the final temperature for five minutes, and the pH was then adjusted to 7.7 to 7.9 with 50% sodium hydroxide. A second amount of 507.6 grams of urea was added. The pH was again adjusted within range, the reaction cooled to 25° C., and placed in an appropriate container.

This urea-formaldehyde precursor was a 2.0 final F/U mole ratio product, with a viscosity of 98 cps, a pH of 7.7, and a calculated solids content of 66%.

EXAMPLE 7

Larger Scale Production of One Preferred Embodiment; F/U Mole Ratio 2.5:1

In order to evaluate a large scale reaction, a 300 pound batch of the 2.5 F/U mole ratio urea-formaldehyde precursor was manufactured in a pilot plant facility.

A 40-gallon reactor was charged with 213.1 pounds of a 50% formaldehyde solution. The pH of the solution was adjusted to 0.9 with approximately 0.21 pounds (95.26 grams) of concentrated sulfuric acid. The temperature of the solution was raised to 50° C. with a small amount of steam and then 65.6 pounds of prilled urea were charged to the formaldehyde solution from the top of the reactor vessel in fifteen equal increments over a fifteen minute period of time. During the addition of urea the temperature was maintained between 50° C. and 95° C., by the heat of reaction.

After the initial charge of urea was added, the mixture was held at 80° C. for five minutes and the pH was adjusted to 7.82 with 1.35 pounds of 50% sodium hydroxide. A second charge of 19.7 pounds of urea was then added. The pH was adjusted with formic acid to 7.8, and the mixture was cooled to 25° C. After cooling, the product was drummed off into five gallon containers.

This urea-formaldehyde precursor had an F/U mole ratio of 2.5:1, a final pH of 7.9, viscosity of 45 cps, specific gravity of 1.2334, and a solids content of 64.1%.

GENERAL

The pertinent data with respect to Examples 1 through 7 inclusive is summarized in Table I, below.

TABLE I

Various Urea-Formaldehyde Preconcentrate Formulations Percentages by Weight

| Materials | Example #1 | #2 | #3 | #4 | #5 | #6 | #7 |
|---|---|---|---|---|---|---|---|
| Formaldehyde Solution (50%), as is | 76.29% | 75.78% | 72.91% | 71.03% | 68.87% | 66.37% | 71.03% |
| Sulfuric Acid | 0.09 | 0.05 | 0.08 | 0.07 | 0.07 | 0.07 | 0.07 |
| Urea, first stage addition | 23.44 | 24.08 | 22.46 | 21.88 | 21.21 | 20.45 | 21.9 |
| Sodium Hydroxide Solution (50%), as is | 0.18 | 0.09 | 0.46 | 0.45 | 0.44 | 0.42 | 0.45 |
| Urea, second stage addition | — | — | 4.09 | 6.57 | 9.41 | 12.69 | 6.57 |
| Total Material | 100.0% | 100.0% | 100.0% | 100.0% | 100.0% | 100.0% | 100.0% |
| % Urea + % Formaldehyde (exclusive of water) | 61% | 62% | 63% | 64% | 65% | 66% | 64.1% |
| F/U Mole Ratio | 3.25:1 | 3.14:1 | 2.75:1 | 2.50:1 | 2.25:1 | 2.0:1 | 2.5:1 |

Storage life studies were run on the above formulations at 72° F., Table II below, and at 110° F., Table III below.

TABLE II

| Example Number | 72° F. Storage Life Study (Viscosity, cps) | | | | | |
|---|---|---|---|---|---|---|
| | Days | | | | | |
| | 1 | 28 | 42 | 56 | 84 | 102 |
| 1 | 35 | 102 | — | 102 | 112 | 132 |
| 2 | 42 | 140 | — | 146 | 176 | 184 |
| 3 | 80 | 114 | 122 | 124 | 130 | 145 |
| 4 | 89 | 124 | 127 | 130 | 157 | 176 |
| 5 | 93 | 157[1] | | | | |
| 6 | 98 | Settled[2] | | | | |

Notes:
[1] The originally clear solution clouded and setted out after 14 days.
[2] Turned cloudy after 7 days.

At room temperature 72° F.), as shown by the data in Table II, the precursor resins of Examples 1-4 exhibited good storage life, greater than 102 days. At F/U mole ratios of 2.25:1 or less, as in Examples 5 and 6, the concentrates turned cloudy after 7 days. The Example 6 product settled out of solution after 14 days at room temperature. The precursors of Examples 5 and 6, having F/U mole ratios of 2.25:1 and 2.0:1 respectively, accordingly are not deemed to have practical storage stability. This conclusion is borne out by the storage stability data at 110° F., reported in Table III, below.

TABLE III

| Example Number | 110° F. Storage Life Study (Viscosity, cps) | | | | | | |
|---|---|---|---|---|---|---|---|
| | Days | | | | | | |
| | 1 | 7 | 14 | 21 | 56 | 84 | 102 |
| 1 | 35 | 35 | 35 | 35 | 64 | 64 | 64 |
| 2 | 42 | 50 | 55 | 68 | 91 | 124 | 141 |
| 3 | 40 | 39 | 42 | 63 | — | — | 74 |
| 4 | 45 | 50 | 54 | 64 | — | — | 103 |
| 5 | 51 | 56[1] | — | — | — | — | — |
| 6 | 120 | 185 | Gelled | — | — | — | — |

Notes:
[1] Turned cloudy.

An accelerated aging test was run at 110° F., as reported above. At this higher temperature, the precursor resins of Examples 5 and 6 again turned cloudy after 7 days. The 2.0:1 F/U mole ratio precursor resin of Example 6 gelled after 14 days. Those condensate and precursor formulations having F/U mole ratios greater than or equal to 2.5:1 (Examples 1-4) showed good stability beyond 102 days.

EXAMPLE 8

Production of A More Advanced U-F Resin, Using Precursor

Resin Made According to the Most Preferred Example, 4

A 40-gallon reactor was charged with 4,564 pounds of a precursor resin made according to the process of Example 4. This precursor was stirred and adjusted to a 7.2 pH with 5.5 pounds of triethanolamine. To this was added 174 pounds of urea and the mixture was refluxed for one-half hour. The pH was adjusted to 6.0 with 30% formic acid and the reaction mixture was condensed to an E/E+ Gardner viscosity.

Next, the pH was adjusted to 7.4 with triethanolamine and the reaction mixture was vaccuum concentrated to a specific gravity of 1.268. Sodium chloride and 552 pounds of urea were added and the final pH adjusted to 7.7.

The physical properties of the resin product are listed below in Table IV.

TABLE IV

| Physical Properties of Advanced UF Resin | |
|---|---|
| | Ex. 8B Resin |
| % Solids | 64.5 |
| Specific Gravity | 1.293 |
| pH | 7.6 |
| Viscosity, cps | 250 |
| F/U Mole Ratio | 1.6:1 |
| % of Urea by Weight, Based on Solids, Dry Basis, approx. | 55.5% |
| % of Urea by Weight, As Is Basis | 28.5% |
| % Formaldehyde by Weight, Dry Basis, approx. | 44.5% |

The advanced resin produced by this technique, using the precursor of the invention, has characteristics and physical properties that are very similar to those of U-F resins made in a conventional manner to similar parameters.

The precursor resin of Example 4 can also be used to make a UF-85 concentrate (i.e., 85% solids) for use in the liquid fertilizer industry.

CONCLUSION

While various precursor formulations having an F/U mole ratio of 2.0:1 or greater can be manufactured, an F/U mole ratio not below 2.5:1 is most preferred for a precursor for resin synthesis since it contains more urea than higher F/U mole ratio precursors. The additional urea content of the precursor requires the addition of less urea during manufacture of the final resin, and also permits the shipment and storage of precursors with less water, and with good storage stability. There are obvious freight savings in shipments containing higher solids, i.e., low mole ratio precursors.

As the stability data in Tables II and III demonstrate, the precursors of the invention are stable for reasonable periods of time particularly at room temperature. Precursor prepared generally according to Example 4 is most preferred, as providing an optimum balance of solids content and stability.

While the invention has been disclosed in this patent application by reference to the details of preferred embodiments of the invention, it is to be understood that this disclosure is intended in an illustrative rather than in a limiting sense, as it is contemplated that modifications will readily occur to those skilled in the art, within the spirit of the invention and the scope of the appended claims.

What is claimed is:

1. A process for preparing a urea-formaldehyde resin precursor having an F/U mole ratio of 5:1 to not below 2.5:1, that comprises an acidic condensation as a first step, which condensation comprises slowly charging urea to an acidic aqueous formaldehyde solution having an initial pH of from about 0.5 to about 1.0 while maintaining the temperature of the solution in the range from about 50° C. to about 98° C., until the initial F/U mole ratio is not above 5:1 and not below 3.0:1, and then neutralizing the reaction mixture to a pH of 7.2 to 8.0.

2. The process of claim 1 wherein urea is charged at a temperature not above 95° C., the reaction mixture is neutralized to a pH of 7.2 to 7.9, then a final charge of urea is added to adjust to a final F/U mole ratio to 3.25:1 to 2.5:1.

3. A process in accordance with claim 2 wherein the reaction mixture is neutralized to a pH in the range of 7.7 to 7.9, and the F/U mole ratio after the addition of the final charge of urea is 2.6:1 to 2.5:1.

4. A process according to claim 3 wherein the solids content of the product obtained is from 60% to 69% by weight.

5. The process of claim 1 wherein urea is charged at a temperature not above 95° C., and sufficient urea is added that the F/U mole ratio of the product is from 3.25:1 to 3.0:1.

6. The process of claim 5 wherein the F/U mole ratio of the product is 3.1:1.

7. The process of claim 5 wherein the reaction mixture is neutralized to a pH in the range of 7.7 to 7.9, and the F/U mole ratio after the addition of the final charge of urea is 2.6:1 to 2.5:1, and wherein the reactants are selected and added so that the solids content of the product is from 60% to 64% by weight of the product.

8. A process according to claim 2 wherein the viscosity of the final product of the process as produced is from 30 cps to 100 cps, as measured on a Brookfield RVF viscometer using a No. 1 spindle at 90 rpm at 25° C.

9. A process according to claim 8 wherein, after the final charge of urea is added, the pH is adjusted to 7.2 to 8.0.

10. A process for preparing a urea-formaldehyde resin precursor having an F/U mole ratio of 3.25:1 to 2.5:1, comprising:

slowly charging urea to an acidic aqueous formaldehyde solution having a pH of 0.8 to 1.0, while maintaining the temperature of the solution in the range from about 50° C. to about 98° C., to form a condensate having an initial F/U mole ratio from 5:1 to 3.0:1, and then adjusting the pH of the condensed reaction mixture to 7.2 to 8.0, then adding more urea to attain an F/U mole ratio in the range from 3.25:1 to 2.5:1, and then adjusting the pH of the final reaction product to 7.2 to 8.0.

11. The process of claim 10 wherein the urea is added to the acidic formaldehyde solution at a temperature not above 85° C. and sufficient urea is initially added to the acidic formulation that the F/U mole ratio of said condensate is from 3.25:1 to 3.0:1.

12. The process of claim 11 wherein, in the step of adding more urea to the condensate, urea is added to attain a final F/U mole ratio of the resin precursor of from 3.0:1 to 2.5:1.

13. A process according to claim 12 wherein the resin precursor product as produced has a viscosity in the range from 30 cps to 100 cps, is adjusted to a pH of 7.4 to 7.9, and has a solids content of from 60% to 69%.

14. The process of claim 11 wherein, in the step of adding more urea to the condensate, urea is added to attain a final F/U mole ratio of the resin precursor of 3.0:1 to 2.5:1, the viscosity of the final reaction product as produced is in the range from 30 cps to 100 cps, the pH is adjusted to the range from 7.4 to 7.9, and the solids content is in the range from 60% to 69%.

15. The process of claim 14 wherein urea is added to a final F/U mole ratio of 2.6:1 to 2.5:1, and wherein the solids content of the final reaction product is in the range from 60% to 66%.

16. A urea-formaldehyde condensation product produced by the process of claim 1.

17. A urea-formaldehyde resin precursor product produced by the process of claim 10.

18. A urea-formaldehyde resin precursor product produced by the process of claim 15.

19. A urea-formaldehyde condensate that is characterized by having an initial F/U mole ratio of from 5:1 to 2.5:1, produced by an initially acidic reaction between urea and formaldehyde at an initial pH less than about 1.0, said condensate being adjusted to a pH of 7.2 to 8.0, having a solids content of 60% to 69%, and having a storage life at 72° F. greater than 102 days without becoming cloudy or settling.

20. A urea-formaldehyde condensate according to claim 19 wherein said initially acidic reaction is at a temperature not above 85° C., the F/U mole ratio is in the range 3.25:1 to 3.0:1, and the pH is adjusted to 7.2 to 7.9.

21. The condensate of claim 20 wherein the F/U mole ratio is 3.1:1.

22. A urea-formaldehyde resin precursor that has a final F/U mole ratio in the range from 3.25:1 to 2.5:1, a solids content of from 62% through 69%, a pH of 7.2 to 8.0, and a storage life at 72° F. that is greater than 102 days, without becoming cloudy or settling.

23. The precursor of claim 22 wherein the mole ratio is 3.0:1 or less, the solids content is at least 63%, and the pH is 7.4 or higher.

24. The precursor of claim 22 in the form of an aqueous dispersion having a viscosity as produced in the range from 30 cps to 100 cps.

25. The precursor of claim 23 wherein the solids content is not above 66%, and said precursor is in the form of an aqueous dispersion having a viscosity as produced in the range from 30 cps to 100 cps.

26. A urea-formaldehyde resin precursor produced from the condensate of claim 20, that has a final F/U mole ratio in the range of 3.0:1 to 2.5:1, a solids content of from 62% through 69%, a pH of 7.2 to 8.0, and a storage life at 72° F. that is greater than 102 days, without becoming cloudy or settling.

27. An aqueous dispersion of a urea-formaldehyde resin precursor having a molar ratio of formaldehyde to urea in the range from about 3.25:1 to about 2.5:1, said dispersion being characterized by having a solids content in the range 62% to 69%, a pH of 7.2 to 8.0, and a viscosity not in excess of about 200 cps as measured on a Brookfield Viscometer Model RVF, No. 1 spindle, at 20 rpm and at 25° C., after storage, following its production, for 102 days at a temperature of 72° F.

28. The aqueous dispersion of claim 27 of a urea-formaldehyde resin precursor that is formed from a condensation product of urea and formaldehyde having a molar ratio of formaldehyde to urea in the range from about 3.25:1 to about 3.0:1, formed by the addition of urea to an aqueous solution of formaldehyde at an initial pH of 1 or less, and at a temperature not above 85° C., said precursor having a final F/U mole ratio of 3.0:1 to 2.5:1 and having been produced from a reaction at a temperature of 50° C. to 85° C., then adjusted to a pH of 7.2 to 8.0, and characterized by having a viscosity as produced in the range from about 35 cps to about 100 cps, as measured on a Brookfield Viscometer Model RVF, Spindle No. 1, at 20 rpm and at 25° C., which viscosity is stable to a viscosity not in excess of 200 cps after storage at a temperature of 72° F. for at least 102 days.

29. The aqueous dispersion of claim 28 having a pH of 7.6 to 7.9, and a solids content of 62% to 66%.

* * * * *